United States Patent [19]
Putrino et al.

[11] Patent Number: 5,805,475
[45] Date of Patent: Sep. 8, 1998

[54] LOAD-STORE UNIT AND METHOD OF LOADING AND STORING SINGLE-PRECISION FLOATING-POINT REGISTERS IN A DOUBLE-PRECISION ARCHITECTURE

[75] Inventors: Michael Putrino; Lee E. Eisen, both of Austin, Tex.

[73] Assignee: International Business Machines Corporation, Armonk, N.Y.

[21] Appl. No.: 816,067

[22] Filed: Mar. 11, 1997

Related U.S. Application Data

[63] Continuation of Ser. No. 386,979, Feb. 10, 1995, abandoned.

[51] Int. Cl.$^6$ .................................. G06F 7/00; G06F 7/38
[52] U.S. Cl. .................................. 364/715.03; 364/748.01
[58] Field of Search .................. 364/715.02, 715.03, 364/715.04, 736.5, 737, 745, 748.01, 748.02; 341/95, 102, 103

[56] References Cited

U.S. PATENT DOCUMENTS

| | | | |
|---|---|---|---|
| 3,389,379 | 6/1968 | Erickson et al. | 364/715.03 |
| 4,386,399 | 5/1983 | Rasala et al. | 395/375 |
| 4,398,243 | 8/1983 | Holberger et al. | 395/375 |
| 4,434,459 | 2/1984 | Holland et al. | 395/375 |
| 4,511,990 | 4/1985 | Hagiwara et al. | 364/748 |
| 4,528,640 | 7/1985 | Criswell | 364/715.04 X |
| 4,722,068 | 1/1988 | Kuroda et al. | 364/757 |
| 4,805,128 | 2/1989 | Nelsen et al. | 364/715.03 |
| 4,949,291 | 8/1990 | Saini | 364/715.03 |
| 5,235,533 | 8/1993 | Sweedler | 364/715.03 |
| 5,268,855 | 12/1993 | Mason et al. | 364/748 |
| 5,272,660 | 12/1993 | Rossbach | 364/748 |
| 5,317,526 | 5/1994 | Urano et al. | 364/715.03 |
| 5,341,506 | 8/1994 | Nohmi et al. | 395/800 |
| 5,523,961 | 6/1996 | Naini | 364/715.03 |

*Primary Examiner*—Chuong Dinh Ngo
*Attorney, Agent, or Firm*—Casimer K. Salys; Brian F. Russell; Andrew J. Dillon

[57] ABSTRACT

A floating point numbers load-store unit includes a translator for converting between the single-precision and double-precision representations, and Special-Case logic for providing Special-Case signals when a store is being performed on zero, infinity, or NaN. A store-float-double instruction is executed by concatenating a suffix to the mantissa in the single-precision floating-point register and replacing the high-order bit of the exponent with a prefix selected as a function of the high-order bit, wherein the resulting mantissa and exponent form a double-precision floating-point number that is then stored to memory. A load-float-double instruction is executed by dropping the suffix from the mantissa of the double-precision floating-point number in memory, and replacing the prefix with the high-order bit, wherein the resulting mantissa and exponent form a single-precision floating-point number that is then loaded into the single-precision floating-point register.

21 Claims, 6 Drawing Sheets

LOAD-STORE UNIT AND METHOD OF LOADING AND STORING SINGLE-PRECISION FLOATING-POINT REGISTERS IN A DOUBLE-PRECISION ARCHITECTURE

This is a continuation of application Ser. No. 08/386,979, filed Feb. 10, 1995, now abandoned.

BACKGROUND OF THE INVENTION

1. Technical Field

The present invention relates in general to microprocessors and in particular to load-store execution units in microprocessors. Still more particularly, the present invention relates to a load-store unit and method for saving and restoring from/to single-precision floating-point registers compliant with the ANSI/IEEE Standard 754-1985 for binary floating-point arithmetic in a double-precision architecture.

2. Description of the Related Art

A large percentage of modern personal computer systems are designed with double-precision floating-point registers compliant with the ANSI/IEEE Standard 754-1985 for binary floating-point arithmetic. Consequently, much of the available personal computer floating-point software is designed to operate in a double-precision architecture. Such code assumes it is being executed on a double-precision machine having double-precision registers. When executing subroutines, such as a context switch or interrupt handlers, this software uses the store-float-double (stfd) and load-float-double (lfd) instructions to save and restore the double-precision floating-point registers that are assumed to be present in the double-precision architecture.

The double-precision design of such software makes it incompatible with a single-precision processor that uses single-precision floating-point registers. To allow such code to run unaltered on a load-store unit (LSU) in such a single-precision machine, the store-float-double and load-float-double instructions would have to trap to emulation routines, where the single-precision data is converted to/from double-precision data prior to being saved from or restored to the single-precision registers. Alternatively, the compiler would have to alter the code to replace the sffd/lfd combination with a store-float-single (stf)/load-float-single (lfs) pair that would run on the single-precision floating-point LSU unemulated. This would require separate compilation and maintenance of program versions for single precision machines.

It would be desirable to provide a load-store unit for saving and restoring single-precision floating-point registers that is directly compatible with double-precision architecture and software. For most cases, this LSU would eliminate the long delay created by trap routines handling single-precision to double-precision conversion of data, or the need to recompile the double-precision architecture software to enable double-precision software to operate on a single-precision machine.

SUMMARY OF THE INVENTION

According to the present invention, a load-store unit is provided for storing and loading single-precision floating-point registers in a double-precision architecture. The load-store unit comprises a translator and a double-precision buffer. The translator receives a single-precision floating-point number from a single-precision floating-point register in response to a double-precision store instruction, wherein a single-precision floating-point number has a sign bit, an exponent having a high-order bit, and a mantissa. The translator concatenates a suffix to the mantissa of the single-precision floating-point number to obtain a double-precision floating-point mantissa, and further the translator replaces the high-order bit of the exponent of the single-precision floating-point number with a selected prefix, the prefix being selected as a function of the value of the high-order bit, to obtain a double-precision floating point exponent. The double-precision buffer holds a double-precision floating-point number that includes the double-precision floating-point mantissa and the double-precision floating-point exponent received from the translator, and outputs its contents to a cache memory.

The double-precision buffer also holds a double-precision floating-point number received from the cache memory in response to a double-precision load instruction, wherein a double-precision floating-point number has a sign bit, a mantissa including a suffix, and an exponent including a preselected number of bits forming a prefix, wherein the prefix has a high-order bit. The translator deletes the suffix from the mantissa of a double-precision floating-point number held in the double-precision buffer, wherein the resulting mantissa having the deleted suffix is a single-precision floating-point mantissa, and further the translator replaces the prefix of the exponent with the high-order bit, wherein the resulting exponent is a single-precision floating-point exponent. The translator then outputs a single-precision floating-point number, that includes the single-precision floating-point mantissa and the single-precision floating-point exponent, to a single-precision floating-point register.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
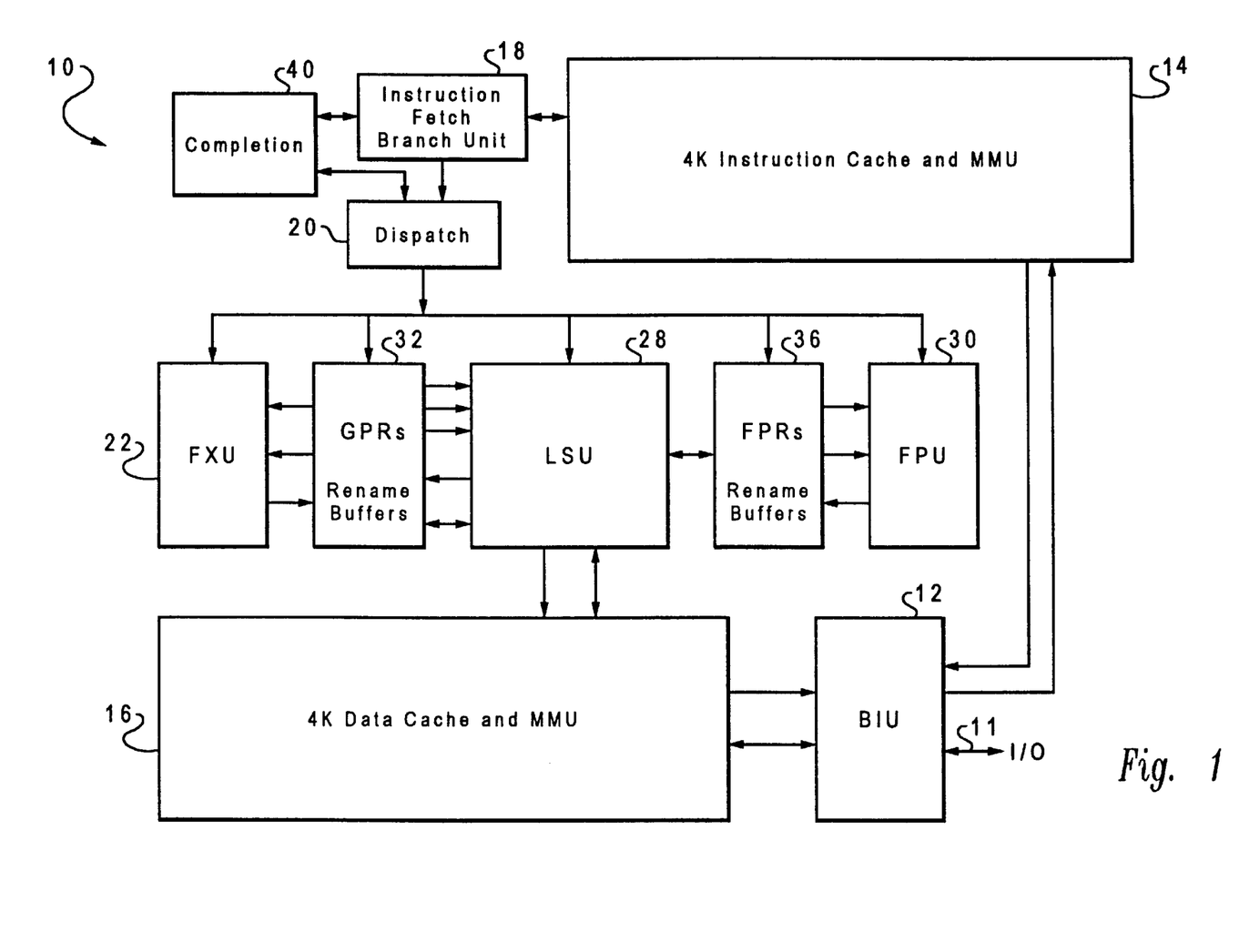
FIG. 1 depicts a processor for processing information according to a preferred embodiment of the present invention.

FIG. 1 is a block diagram of a processor, indicated generally at 10, for processing information according to the preferred embodiment. In the preferred embodiment, processor 10 is a single integrated circuit superscalar microprocessor. Accordingly, as discussed further hereinbelow, processor 10 includes various units, registers, buffers, memories, and other sections, all of which are formed by integrated circuitry. Also, in the preferred embodiment, processor 10 operates according to reduced instruction set computing (RISC) techniques. As shown in FIG. 1, a system bus 11 is connected to a bus interface unit (BIU) 12 of processor 10. BIU 12 controls the transfer of information between processor 10 and system bus 11.

BIU 12 is connected to an instruction cache 14 and to a data cache 16 of processor 10. A high-speed cache, such as instruction cache 14 or data cache 16, enables relatively fast access to a subset of data or instructions which were previously transferred from system memory to the cache, and thus improves the speed of operation of the data processing system. Instruction cache 14 outputs instructions to a branch unit 18. In response to such instructions from instruction cache 14, branch unit 18 selectively outputs instructions to other execution circuitry of processor 10.

The transfer of operands or instructions between system memory connected to system bus 11 and the data or instruction cache is usually effected in fixed-length units called blocks. A block of data may be transferred in varying sizes such as tracks, sectors, lines, bytes, etc., as are known in the art. When a memory access by the branch unit 18 allows retrieval of necessary data from the data cache 16, such success is called a cache "hit", and when retrieval of necessary data cannot be performed in the cache, and so must be performed from system memory or another processor cache, such failure is called a "miss". In addition to branch unit 18, in the preferred embodiment the execution circuitry of processor 10 includes multiple execution units, namely a fixed point unit (FXU) 22, a Load-Store unit (LSU) 28, and a floating point unit (FPU) 30. FXU 22 and LSU 28 input their source operand information from general purpose architectural registers (GPRs) 32. FXU 22 and LSU 28 output results (destination operand information) of their operations for storage at selected entries in fixed point rename buffers in GPRs 32.

Moreover, LSU 28 inputs source operand information from floating point architectural registers (FPRs) 36. FPU 30 inputs its source operand information from FPRs 36, and LSU 28. LSU 28 and FPU 30 output results (destination operand information) of their operations for storage at selected entries in floating point rename buffers in FPRs 36.

In response to the instructions input from instruction cache 14, branch unit 18 selectively dispatches, through dispatch unit 20, the instructions to selected ones of execution units 22, 28, 30, 32, and 36. Each execution unit executes one or more instruction of a particular class of instructions. For example, FXU 22 executes a first class of fixed point mathematical operations on source operands, such as addition, subtraction, ANDing, ORing and XORing.

FPU 30 executes floating point operations on source operands, such as floating point multiplication and division operations.

In response to a Load instruction, LSU 28 inputs information from data cache 16 and copies such information to selected ones of rename buffers in GPRs 32 and FPRs 36 and/or FPU 30. If such information is not stored in data cache 16, then data cache 16 inputs (through BIU 12 and system bus 11) such information from a system memory connected to system bus 11. Moreover, data cache 16 is able to output (through BIU 12 and system bus 11) information from data cache 16 to system memory connected to system bus 11.

In response to a Store instruction from branch unit 18, the LSU 28 generates the store address, and reads data from a selected one of GPRs 32 and FPRs 36. The store address and the data are then written to the data cache when the store instruction is ready to complete.

As information is stored at a selected one of rename buffers in GPRs 32, such information is associated with a storage location (e.g. one of GPRs 32) as specified by the instruction for which the selected rename buffer is allocated. Information stored at a selected one of the rename buffers is copied to its associated one of GPRs 32 in response to signals from branch unit 18. Branch unit 18 directs such copying of information stored at a selected one of the rename buffers in response to "completing" the instruction that generated the information, as indicated by completion unit 40. In the preferred embodiment, processor 10 may have multiple completions of instructions during a single cycle of processor 10.

As information is stored at a selected one of the rename buffers in FPRs 36, such information is associated with one of FPRs 36. Information stored at a selected one of the rename buffers is copied to its associated one of FPRs 36 in response to signals from branch unit 18. Branch unit 18 directs such copying of information stored at a selected one of the rename buffers in response to "completing" the instruction that generated the information, as indicated by completion unit 40. In the preferred embodiment, processor 10 may have multiple completions of instructions during a single cycle of processor 10.

Processor 10 achieves high performance by processing multiple instructions simultaneously at various ones of execution units 22, 28, 30, 32, and 36. Accordingly, each instruction is processed as a sequence of stages, each being executable in parallel with stages of other instructions. Such a technique is called "pipelining". An instruction is normally processed as five stages, namely fetch, decode/dispatch, execute, finish, and completion.

In the fetch stage, branch unit 18 selectively inputs (from instructions cache 14) one or more instructions from one or more memory addresses storing the sequence of instructions.

In the decode/dispatch stage, branch unit 18 decodes up to three fetched instructions and selectively dispatches up to three decoded instructions to selected (in response to the decoding in the decode stage) ones of execution units 22, 28, 30, 32, and 36 after reserving a rename buffer entry for each dispatched instructions' result (destination operand information). Processor 10 dispatches instructions in order of their programmed sequence. The branch unit assigns a unique tag to each instruction as the instruction identifier (IID).

In the execute stage, execution units execute their dispatched instructions as soon as the operands are ready. In the finish stage, execution units store output results (destination operand information) at selected entries in rename buffers as discussed further hereinabove. Each execution unit signals the branch unit that it has finished executing an instruction. The execution unit sends the instruction status along with the IID back to the branch unit.

Figure 2:
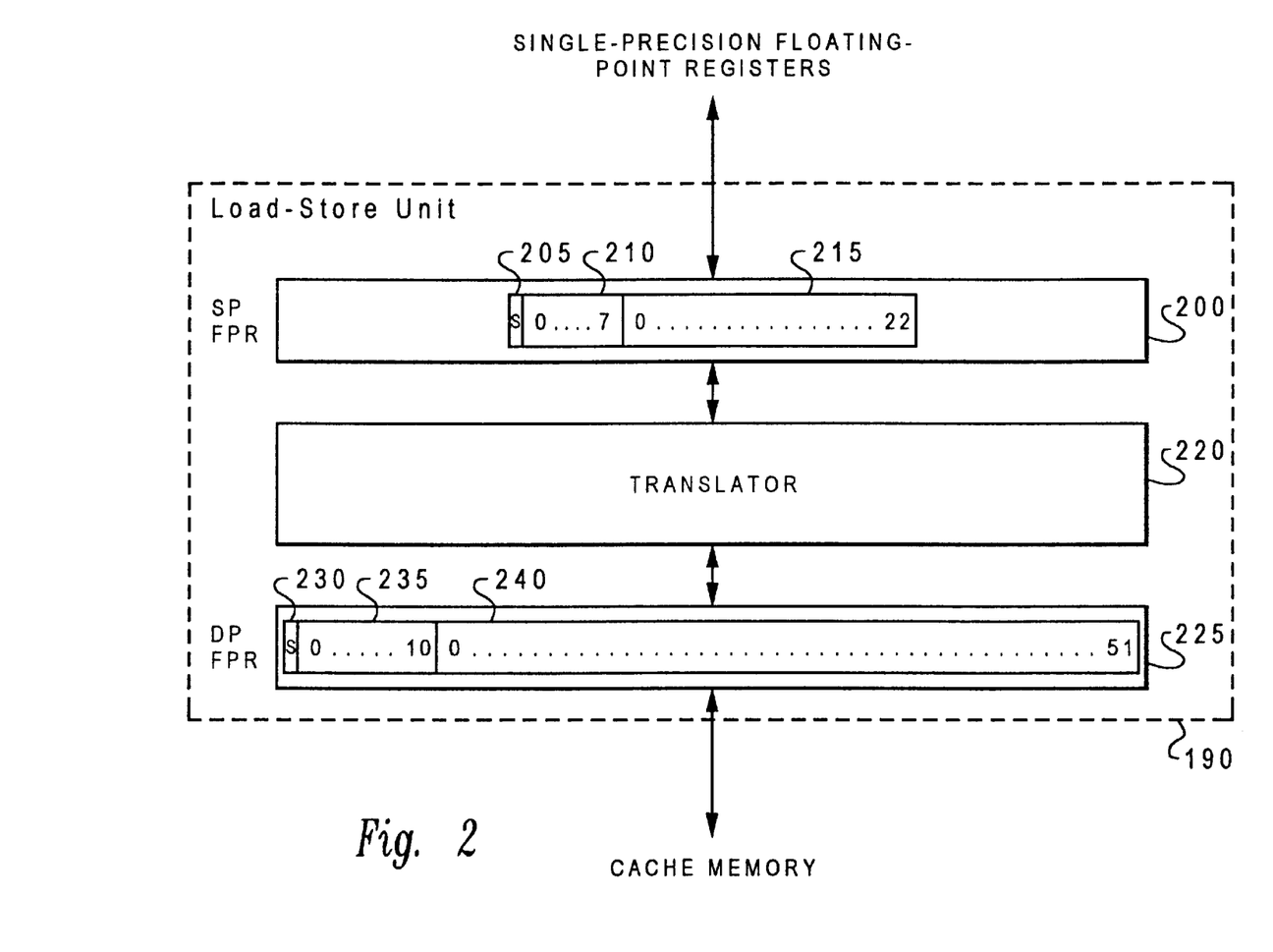
FIG. 2 is a schematic block diagram of a load-store unit (LSU) according to a preferred embodiment of the present invention.

Referring now to FIG. 2, there is a schematic block diagram of a load-store unit (LSU) according to a preferred embodiment of the present invention. The LSU 190 includes single-precision buffer 200, translator 220, and double-precision buffer 225. The operations of transferring numbers between single-precision buffer 200 and the single-precision registers, as well as the operation of transferring numbers between double-precision buffer 225 and cache memory, can be accomplished through operations and hardware as is commonly done in standard load-store units. Such hardware and operations are well known by those skilled in the art.

The LSU 190 begins execution of a store-float-double instruction by loading a single-precision floating-point number from a single-precision register indicated by the instruction, into single-precision buffer 200. In a preferred embodiment, the LSU 190 performs all load-store operations compliant with the ANSI/IEEE Standard 754-1985 for binary floating-point arithmetic. (Most microcomputers have adopted this IEEE floating-point standard.) According to this standard, a single-precision floating-point number received by single-precision buffer 200 will have a sign bit 205, 8-bit exponent 210, and a 23-bit fraction representing the mantissa 215.

Before converting the exponent 210 to the double-precision format, the exponent 210 and mantissa 215 are tested by the Special-Case Logic 255 (shown in detail in FIG. 5) to determine if the single-precision number 200 is a denormalized number (represented by the "denormalized number select" signal 380 in Special-Case Logic 255). If this is the case, a trap signal is activated so that the data can be converted and stored by emulation code.

The execution of the store-float-double instruction continues in translator 220. Translator 220 converts a single-precision floating-point number contained in single-precision buffer 200 to a double-precision floating-point number and deposits it in double-precision buffer 225. In accordance with the IEEE 754 Standard, the double-precision floating-point number has a sign bit 230, 11-bit exponent 235, and a 52-bit mantissa 240.

The logical operation of translator 220 is now described with reference to FIGS. 3A, 3B, 4A and 4B. The IEEE 754 Standard assumes the value of the exponent bias is 127 for single-precision 32-bit numbers and 1023 for double-precision 64-bit numbers. When rebiasing an exponent to convert it from the IEEE single-precision format to the IEEE double-precision format, an additional bias equal to the difference between these two biases must be applied to the single-precision exponent to arrive at the double-precision form. The difference is +896 (1023–127), or in binary format, +896=01110000000. Since a single-precision exponent is 8 bits wide, the single-precision exponent can take on the following two forms:

1nnnnnnn or 0nnnnnnn, where n is any binary number, 0 or 1.

Therefore, when making a single-precision to double-precision conversion, the additional bias of +896 is added to one of these two exponents. The result of this addition is as follows:

$$\frac{1nnnnnnn}{+01110000000} \text{ or } \frac{0nnnnnnn}{+01110000000}$$
$$\overline{1000nnnnnnn} \quad \overline{0111nnnnnnn}$$

Therefore, according to the present invention, the high-order bit of the single-precision exponent is tested, and, if it is equal to "0", the high-order bit of the single-precision exponent is replaced with a 4-bit prefix of "0111", yielding the new double-precision exponent. Likewise, if the high-order bit of the single-precision exponent is equal to "1", the high-order bit is replaced with a 4-bit prefix of "1000", yielding the new double-precision exponent. This can be said another way: three bits that are the inverse of the high-order bit are inserted in the single-precision exponent after the high-order bit.

Therefore, the present invention utilizes the high-order bit of the single-precision exponent and its inverted form to produce the 4-bit prefix that replaces the high-order bit to yield the double-precision exponent. As can be seen from the logic diagram of FIG. 3A, the high-order bit is directly translated into the high-order bit of the prefix. The remaining three bits are set to the inverted form of the high-order bit. In an alternative preferred embodiment, the high-order bit could be used to control a multiplexor to select either a "0111" or "1000" prefix, depending on the value of the high-order bit of the single-precision exponent.

Figure 3A:
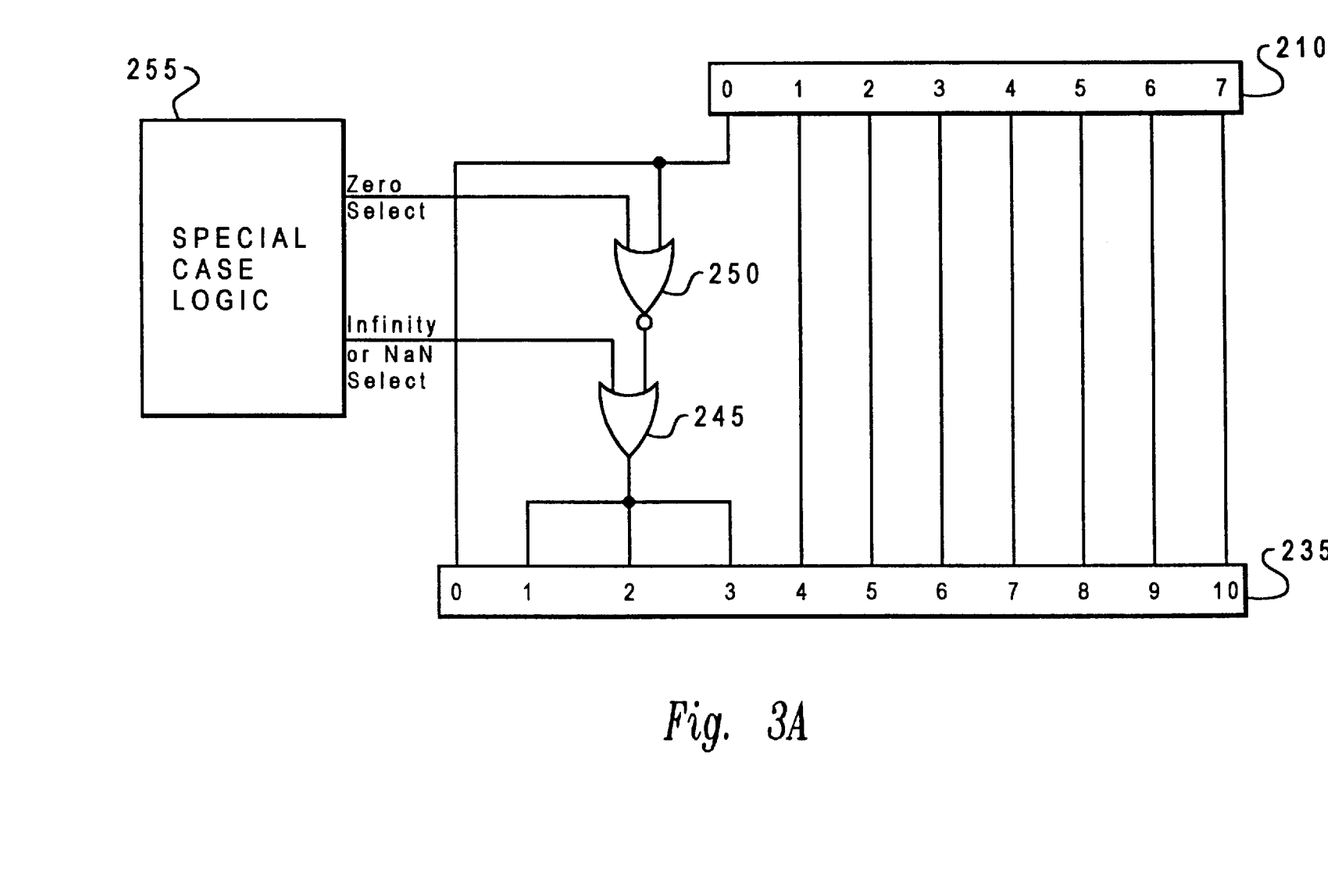
FIG. 3A depicts a logic diagram showing the function performed by the present invention for translating a single-precision exponent value to a double-precision exponent value according to a preferred embodiment of the present invention.

FIG. 3A depicts the logical function performed by translator 220 to convert the single-precision exponent value 210 to the double-precision exponent value 235. Initially, Special-Case Logic Circuitry 255 (to be described in conjunction with FIG. 5) determines if the single-precision exponent value 210 is equal to zero or infinity, or is not-a-number (NaN), or is a denormalized number. In the absence of one of these special cases, the respective inputs to ORgate 245 and NORgate 250 from the Special-Case Logic Circuitry 255 are logical zeros. In that case, as can be seen in FIG. 3A, the lower-order bits 1–7 of the single-precision exponent value 210 are directly translated into bits 4–10 of the double-precision exponent value 235. The high-order bit (0) of the single-precision exponent value 210 is converted into a prefix that consists of the first four high-order bits (0–3) of the double-precision exponent value 235. To generate the prefix, the high-order bit (0) of single-precision exponent value 210 is directly translated into the high-order bit (0) of double-precision exponent 235. Also, the high-order bit (0) of single-precision exponent value 210 is inverted by NORgate 250, and is passed through ORgate 245 to form the remaining three bits (1–3) of the prefix. Thus, it can be seen that in the case of a store-float-double instruction, the exponent field within the data is expanded from the 8-bit, single-precision value to the 11-bit double-precision value. Special-Case hardware 255 (described in detail in conjunction with FIG. 5) sets the double-precision exponent prefix in the case of zero, infinity, NaN, and denormalized numbers.

Figure 3B:
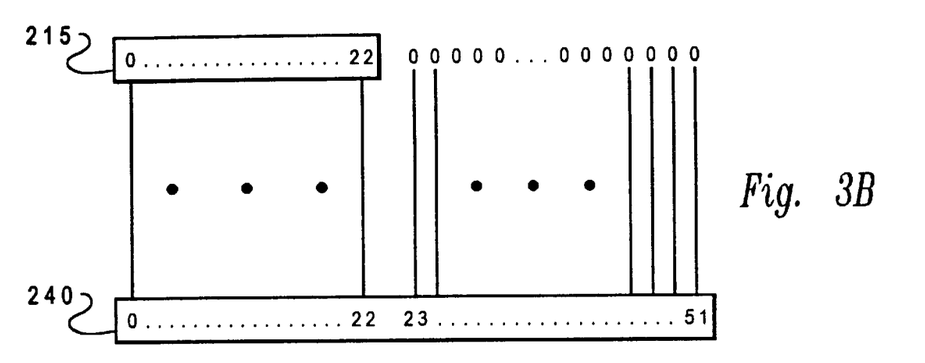
FIG. 3B depicts a logic diagram of the function performed by the translator in converting single-precision mantissa in single-precision buffer to the double-precision mantissa in double-precision buffer according to a preferred embodiment of the present invention.

FIG. 3B depicts a logic diagram of the function performed by translator 220 in converting single-precision mantissa 215 in single-precision buffer 200 to the double-precision mantissa 240 in double-precision buffer 225. In the IEEE 745 Standard, the mantissa field assumes that the binary point is to left of the first bit. Thus, in converting from a 23-bit precision to 52-bit precision, the fraction data is concatenated with zeros in the lower significant bits to fill out the 52-bit field. As seen in FIG. 3B, bits 0–22 of the single-precision mantissa 215 is directly translated into bits 0–22 of double-precision mantissa 240. The remaining lower significant bits (23–51), herein referred to as the suffix, are set to logical zeros. The sign bit is translated directly from single-precision sign bit 205 to double-precision sign bit 230.

The double-precision floating-point number contained in double-precision buffer 225 has now been converted from the single-precision floating-point number input from single-precision buffer 200. The content of double-precision buffer 225 is in a form to be stored as a double-precision number in cache memory, as is expected by the executing software. Consequently, the store-float-double instruction can be completed by the LSU 190 by sending the new double-precision floating-point number to the cache memory. It will be appreciated that the LSU 190 of the present invention enables a store-float-double instruction to be directly executed on the single-precision floating-point registers.

Referring again to FIG. 2, the LSU 190 of the present invention is also capable of executing a load-float-double instruction to restore data to the single-precision floating-point registers. The load-float-double instruction is executed by loading the subject double-precision floating-point number from cache memory into double-precision buffer 225. Translator 220 then converts the double-precision floating-point number into a single-precision floating-point number and loads this number into single-precision buffer 200. The load-float-double instruction is then completed by loading this converted single-precision floating-point number into the subject register. The operations of transferring numbers between single-precision buffer 200 and the single-precision registers, as well as the operation of transferring numbers between double-precision buffer 225 and cache memory can be accomplished through operations and hardware as is commonly done in standard load-store units. Such hardware and operations are well known by those skilled in the art.

Figure 4A:
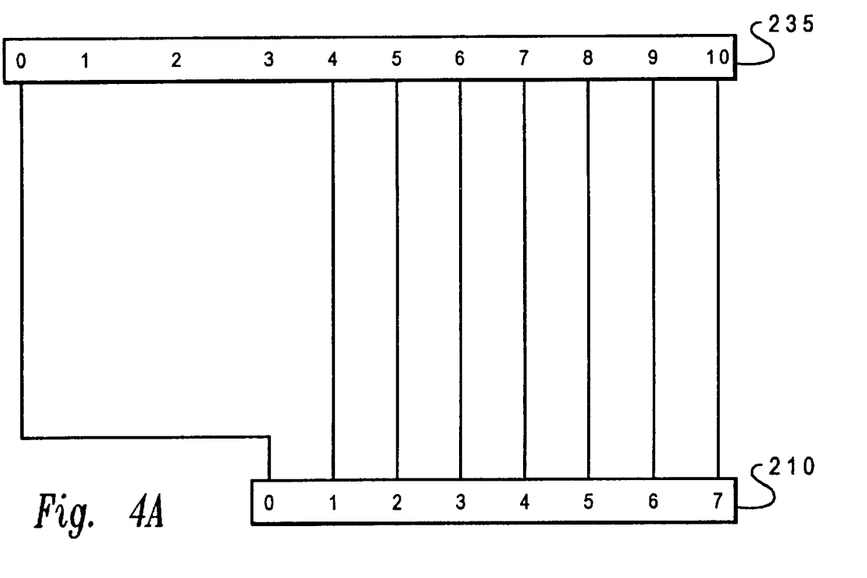
FIG. 4A depicts a logic diagram showing the function performed by the present invention for translating a double-precision exponent value to a single-precision exponent value according to a preferred embodiment of the present invention.

Referring now to FIG. 4A, there is depicted a logic diagram showing the function performed by the present invention for translating a double-precision exponent value to a single-precision exponent value. When the LSU 190 of the present invention receives a load-float-double instruction, the subject double-precision floating-point number is retrieved from cache memory and deposited in double-precision buffer 225. The exponent field 235 is reduced from the 11-bit double-precision value to the 8-bit single-precision value 210 by translator 220 and is rebiased as necessary.

Figure 6:
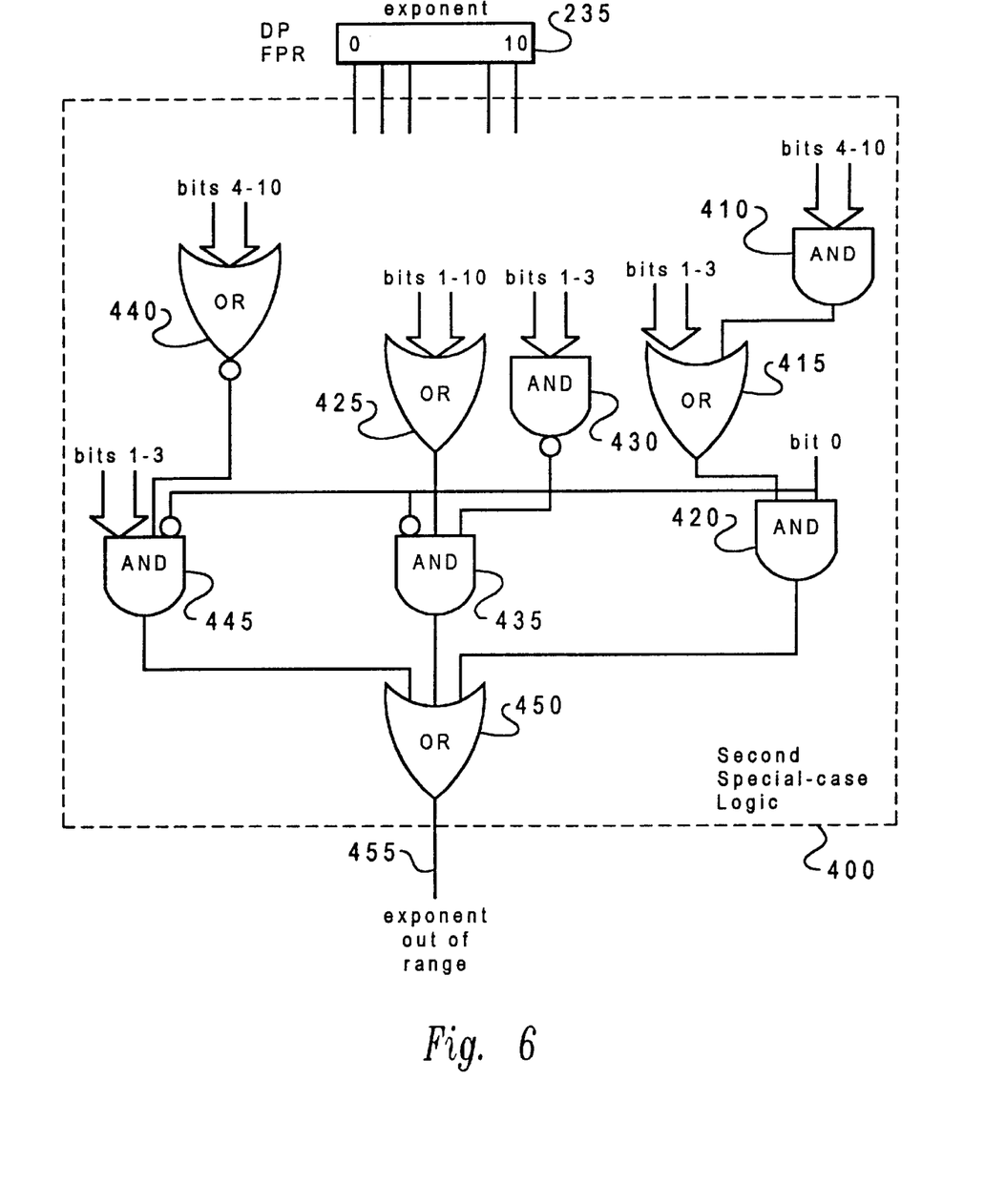
FIG. 6 depicts a schematic diagram of second Special-Case Logic circuitry, according to a preferred embodiment of the present invention.

Before converting the exponent 235 to single-precision format, the exponent 235 is tested by Second Special-Case Logic 400 (shown in FIG. 6) to determine if exponent 235 is out of the single-precision range, depicted by the "exponent out of range" signal 455 in FIG. 6. If this is the case, a trap signal is activated so that the data can be loaded by emulation code into an emulated double-precision floating-point register configured in cache memory.

As can be seen in FIG. 4A, the conversion to a single-precision exponent value 210 is performed by retaining the high-order bit of double-precision exponent value 235 in single-precision exponent value 210, dropping the next three bits (1, 2, 3), and setting bits 4–10 of double-precision exponent value 235 as bits 1–7 of single-precision exponent value 210. In other words, the conversion is performed by retaining the high-order bit, deleting the next three bits, and concatenating the high-order bit with the remaining seven low-order bits.

If translator 220 determines the double-precision exponent value is out of the single-precision exponent range, a trap signal is activated so that the conversion can be performed via emulation software. This, however, does not usually occur for context switch and interrupt handler software because the double-precision data retrieved from the cache memory is usually the same data that had previously been the subject of a store-float-double instruction, and, thus, was previously a single-precision floating-point number within the single-precision exponent range.

Figure 4B:
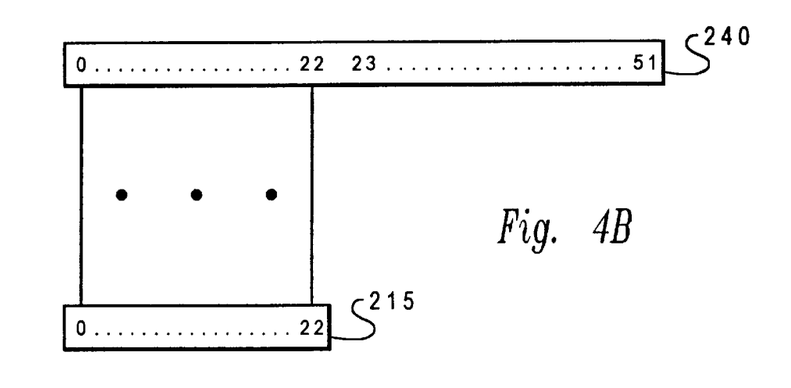
FIG. 4B depicts a logic diagram showing the function of converting a double-precision mantissa to a single-precision mantissa according to a preferred embodiment of the present invention.

Referring now to FIG. 4B, there is depicted a logic diagram showing the function performed by the LSU of the present invention in converting a double-precision mantissa to a single-precision mantissa. As can be seen in FIG. 4B, the conversion is performed by directly translating bits 0–22 from double-precision mantissa 240 into single-precision mantissa 215, and deleting the suffix which comprises the remaining bits (23–51). Before converting the double-precision mantissa 240 contained in double-precision buffer 225, the fraction data is tested to make sure that the bits to be dropped, when converting from the 52-bit double-precision fraction to the 23-bit single-precision fraction, contains nothing but zeros. If there is data in bits 23–51, a trap signal is activated so that the data can be loaded into an emulated double-precision floating-point register configured in cache memory. Otherwise, the conversion is performed as depicted in FIG. 4B. In addition, the sign bit 230 is directly translated to sign bit 205 by translator 220.

With the converted number now residing in single-precision buffer 200, the load-float-double instruction is completed by transferring the single-precision floating-point number to the floating-point register that is the subject of the load-float-double instruction. It will be appreciated that the LSU 190 of the present invention enables a store-float-double instruction to be directly executed on the single-precision floating-point registers.

The load-store unit of the present invention is also capable of executing stfd/lfd instructions having special case bit patterns reserved by the IEEE 754 Standard. The IEEE format reserves certain bit patterns for infinite and indefinite non-numbers (resulting, for example, from dividing 0 by 0), and for small denormalized numbers. The IEEE 754 format represents +∞ and −∞ by a maximum exponent field (i.e., all exponent bits set) and a zero mantissa. Indefinite numbers, known as NaN ("not a number"), are represented by a maximum exponent field and a non-zero mantissa. Zero is represented by a zero exponent and a zero mantissa. Last, the IEEE format represents a denormalized number, i.e., one having the maximum exponent but too small to have a normalized representation, by a zero exponent and a non-zero mantissa.

Figure 5:
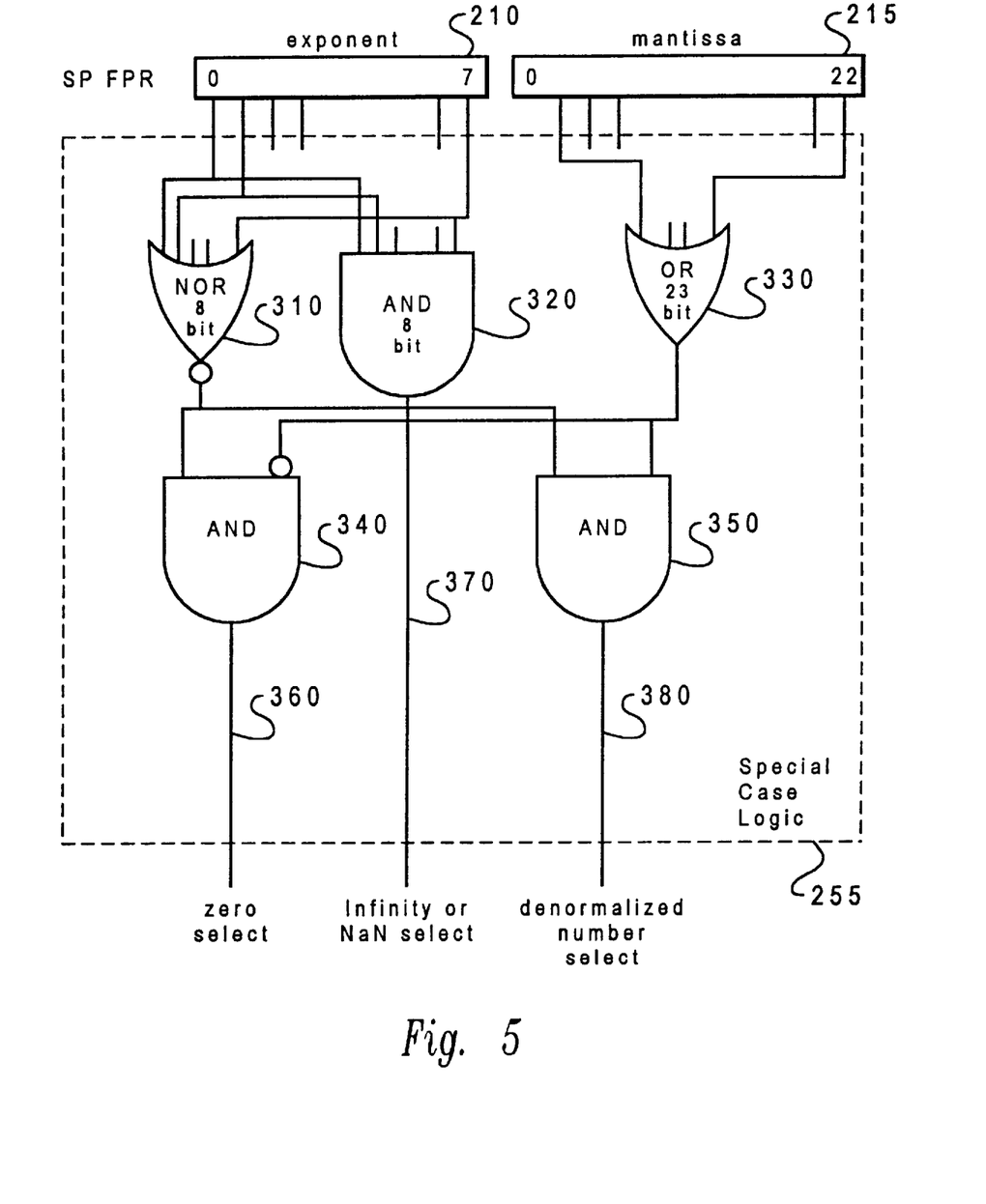
FIG. 5 depicts a schematic diagram of Special-Case logic circuitry, according to a preferred embodiment of the present invention.

Referring now to FIG. 5, there is depicted a schematic diagram of the Special-Case logic circuitry 255, according to the present invention, for detecting these special case numbers. The Special-Case Logic 255 is shown producing the "zero select" signal 360, the "infinity or NaN select" signal 370, and the "denormalized number select" signal 380. All bits of the exponent 210 are connected to inputs of NORgate 310 and ANDgate 320. The output of ANDgate 320 produces the "infinity or NaN select" signal 370. All 32 bits of mantissa 215 are connected to inputs of ORgate 330. The outputs of NORgate 310 and ORgate 330 are connected to ANDgate 340 and ANDgate 350. One input of ANDgate 340 is inverted, this being the input connected to the output of ORgate 330. The output of ANDgate 340 produces the "zero select" signal 360. The output of ANDgate 350 produces the "denormalized number select" signal 380 that activates a trap signal so that the data can be converted and stored by emulation code.

Referring again to FIG. 3A, in the case of a zero, the exponent is an all-zeros value. Therefore, when expanding from a single-precision exponent to a double-precision exponent, the added bits must be zeros. As has been explained with FIG. 5, when the Special-Case logic circuitry 255 determines that the single-precision exponent 210 and mantissa 215 represents a zero value, the "zero select" 360 is set high. This signal is inverted by NORgate 250, setting bits 1–3 to zeros. In the case of infinities or NaNs, the exponent is an all-ones value. When Special-Case logic circuitry 255 determines that the single-precision floating-point number is infinity or NaN, the "infinity or NaN select" signal 370 is set, transferring the "1" through ORgate 245, and setting bits 1–3 to a one value.

Referring to FIG. 6, the Second Special-Case Logic 400 is shown producing the "exponent out of range" signal 455. All bits of exponent 235 are connected to Second Special-Case Logic 400 that contains logic that examines the double-precision exponent 235 to determine if it is out of the single-precision range, thus, requiring emulation codes to load the double-precision data into an emulated double-precision floating-point register configured in cache memory. The exponent 235 is examined to determine if it is greater than or equal to binary 10001111111 (which is equivalent to decimal +128 plus the double-precision bias of +1023). This check is performed by ANDgate 410, ORgate 415, and ANDgate 420. The exponent 235 is also checked to determine if it is less than or equal to binary 01101111111 (which is equivalent to decimal negative 128 plus the double-precision bias of +1023). This check is performed by ORgate 425, ANDgate 430, and ANDgate 435. The exponent 235 is also checked to determine if is equal to binary 01110000000 (which is equivalent to decimal negative 127 plus the double-precision bias of +1023). All three cases will cause a trap and therefor are ORed together by ORgate 450 to produce the "exponent out of range" signal 455.

Thus, referring to FIG. 6, bits 4–10 of exponent 235 are connected to ORgate 440 and ANDgate 410. Bits 1–10 of exponent 235 are connected to ORgate 425. Bits 1 –3 of exponent 235 are connected to ORgate 415, AND gate 430, and ANDgate 445. Bit 0 of exponent 235 is connected to ANDgate 420, ANDgate 435, and ANDgate 445. The output of ANDgate 410 is connected to ORgate 415. The output of ORgate 415 is connected to ANDgate 420. The output of ORgate 425 and the output of ANDgate 430 are both connected to ANDgate 435. The output of ORgate 440 is connected to Andgate 445. The outputs of ANDgate 445, ANDgate 435, and ANDgate 420 all connect to ORgate 450. The output of ORgate 450 produces the "exponent out of range" signal 455.

In summary, according to the present invention, a load-store unit for storing and loading single-precision floating-point registers in a double-precision architecture is provided. The load-store unit includes a translator for converting between the single-precision and double-precision representations, and Special-Case logic for providing Special-Case signals when the store is being performed on a zero, infinity, or NaN. A store-float-double instruction is executed by concatenating a suffix to the mantissa in the single-precision floating-point register and replacing the high-order bit of the exponent with a prefix selected as a function of the high-order bit, wherein the resulting mantissa and exponent form a double-precision floating-point number that is then stored to memory. A load-float-double instruction is executed by dropping the suffix from the mantissa of the double-precision floating-point number in memory, and replacing the prefix with the high-order bit, wherein the resulting mantissa and exponent form a single-precision floating-point number that is then loaded into the single-precision floating-point register. As can be seen, the load-store unit of the present invention substantially increases the speed with which a single-precision processor can save and restore single-precision floating-point registers in a double-precision architectural environment. Thus, the present invention eliminates the long delay produced by the prior art in running trap routines to handle the single-precision to double-precision conversion of data when executing in a double-precision architecture, and in addition, the present invention removes the need to recompile standard software designed for double-precision architecture.

While the invention has been particularly shown and described with reference to a preferred embodiment, it will be understood by those skilled in the art that various changes in form and detail may be made therein without departing from the spirit and scope of the invention.

What is claimed is:

1. A load-store unit for storing and loading from/to single-precision floating-point registers in a double-precision software architecture, wherein a single-precision floating-point number has a sign bit, an exponent having a high-order bit and lower order bits, and a mantissa, the load-store unit comprising:

means for receiving a single-precision floating-point number from a single-precision floating-point register in response to a double-precision store instruction and for concatenating a suffix to the mantissa of the received single-precision floating-point number such that a resulting mantissa having the concatenated suffix is a double-precision floating-point mantissa;

Special-Case logic that determines if the single-precision floating-point number is a special case number and generates special case signals indicating said determination; and prefix generation circuitry that generates a prefix as a function of both the high-order bit and the special case signal; and means for concatenating said prefix with said lower order bits to form a double-precision floating-point exponent.

2. A load-store unit for storing and loading from/to single-precision floating-point registers in a double-precision architecture according to claim 1, wherein the prefix is a set of bits having the high-order bit as a highest-order bit and a plurality of other bits.

3. A load-store unit for storing and loading from/to single-precision floating-point registers in a double-precision architecture according to claim 2, wherein the plurality of other bits are the inverse of the high-order bit.

4. A load-store unit for storing and loading from/to single-precision floating-point registers in a double-precision architecture according to claim 1, wherein a special case number includes zero, infinity, and a NaN.

5. A load-store unit for storing and loading from/to single-precision floating-point registers in a double-precision architecture according to claim 4, wherein the other bits are set to zero when the special case number is zero.

6. A load-store unit for storing and loading from/to single-precision floating-point registers in a double-precision architecture according to claim 4, wherein the other bits are set to one when the special case number is infinity or NaN.

7. A load-store unit for storing and loading from/to single-precision floating-point registers in a double-precision architecture according to claim 1, said Special-Case logic further comprising circuitry that determines if the single-precision floating-point number is a denormalized number.

8. A load-store unit according to claim 1, wherein the prefix generation circuitry includes:
   a first logic gate that receives as inputs the high-order bit and a special case signal indicating if the single-precision floating-point number is zero, said first logic gate producing a intermediate output signal; and
   a second logic gate that receives as inputs said intermediate output signal and a special case signal indicating if the single-precision floating-point number is infinity or NaN, said second logic gate outputting lower order prefix bits that, when concatenated with said high-order bit, together form said prefix.

9. A method in a load-store unit for executing a double-precision store instruction from a single-precision floating-point register, where in the single-precision floating-point register contains a single-precision floating-point number having a sign bit, an exponent having a high-order bit and lower order bits, and a mantissa, the method comprising:
   concatenating a suffix to the mantissa of the single-precision floating-point number contained in the single-precision floating-point register, wherein the resulting mantissa having the concatenated suffix is a double-precision floating-point mantissa;
   determining if the single-precision floating-point number is a special case number and generating special case signals indicative of said determination;
   generating a prefix as a function of both a high-order bit of the exponent and the special case signals;
   forming a double-precision floating-point exponent by concatenating the prefix and the lower order bits; and
   storing the double-precision floating-point mantissa in combination with the double-precision floating-point exponent in memory as a double-precision floating-point number.

10. A method in a load-store unit for executing a double-precision store instruction from a single-precision floating-point register according to claim 9, wherein the prefix is a set of bits having the high-order bit as a highest-order bit and a plurality of other bits.

11. A method in a load-store unit for executing a double-precision store instruction from a single-precision floating-point register according to claim 10, wherein the plurality of lower order bits are the inverse of the high-order bit.

12. A method in a load-store unit for executing a double-precision store instruction from a single-precision floating-point register according to claim 9, wherein a special case number includes zero, infinity, and a NaN.

13. A method in a load-store unit for executing a double-precision store instruction from a single-precision floating-point register according to claim 12, wherein the plurality of lower order bits are set to zero when the special case number is zero.

14. A method in a load-store unit for executing a double-precision store instruction from a single-precision floating-point register according to claim 12, wherein the plurality of lower order bits are set to one when the special case number is infinity or NaN.

15. A method in a load-store unit for executing a double-precision store instruction from a single-precision floating point register according to claim 9, further comprising the step of determining if the single-precision floating-point number is a denormalized number.

16. A translator in a data processing system for converting floating-point number precision, the translator comprising:
   first conversion means including:
      means, responsive to receipt of a single-precision floating-point number having a sign bit, an exponent including a high-order bit and lower order bits, and a mantissa, for concatenating a suffix to the mantissa of the received single-precision floating-point number to form a double-precision floating-point mantissa;
      first Special-Case logic that determines if the single-precision floating-point number is a special case number and that generates special case signals indicating said determination; and
      prefix generation circuitry that generates a prefix as a function of both the high-order bit and the special case signals, wherein the first conversion means concatenates said prefix with said lower order bits to form a double-precision floating-point exponent; and
   second conversion means including:
      second Special-Case Logic, responsive to receipt of a double-precision floating-point number having a sign bit, a mantissa including a suffix, and an exponent including a preselected number of bits forming a prefix, said prefix having a high-order bit, for determining if the double-precision floating-point number is out of single-precision floating-point exponent or mantissa range;
      means, responsive to a determination that said double-precision floating-point number is out of single-precision floating-point exponent or mantissa range, for activating a trap signal that causes said double-precision floating-point number to be loaded into an emulated double-precision floating-point register in memory; and
      means, responsive to a determination that said double-precision floating-point number is not out of single-precision floating-point exponent or mantissa range, for (1) deleting the suffix from the mantissa of a double-precision floating-point number held in the double-precision input buffer, wherein the resulting mantissa having the deleted suffix is a single-precision floating-point mantissa, and for (2) replacing the prefix of the exponent with the high-order bit, wherein the resulting exponent is a single-precision floating-point exponent, and for (3) outputting a single-precision floating-point number including the single-precision floating-point mantissa and the single-precision floating-point exponent.

17. An apparatus according to claim 16, wherein a special case number is at least one of zero, infinity, a denormalized number, and NaN.

18. A translator according to claim 16, wherein the prefix generation circuitry includes:
   a first logic gate that receives as inputs the high-order bit and a special case signal indicating if the single-precision floating-point number is zero, said first logic gate producing a intermediate output signal; and
   a second logic gate that receives as inputs said intermediate output signal and a special case signal indicating if the single-precision floating-point number is infinity or NaN, said second logic gate outputting lower order prefix bits that, when concatenated with said high-order bit, together form said prefix.

19. A method in a data processing system for converting a single-precision floating-point number to a double-precision floating-point number, wherein the single-precision floating-point number has a sign bit, an exponent having a high-order bit and a plurality of lower order bits, and a mantissa, the method comprising:
   concatenating a suffix to the mantissa of the single-precision floating-point number, wherein the resulting mantissa having the concatenated suffix is a double-precision floating-point mantissa;

determining if the single-precision floating-point number is a special case number and generating special case signals indicative of said determination;

generating a prefix as a function of both a high-order bit of the exponent and the special case signals;

forming a double-precision floating-point exponent by concatenating the prefix and the plurality of lower order bits, wherein the sign bit, the double-precision floating-point exponent, and the double precision-floating point mantissa form the converted double-precision floating-point number.

20. A method in a data processing system for converting a single-precision floating-point number to a double-precision floating-point number according to claim 19, wherein the prefix is generated for non-special case numbers by concatenating a preselected number of bits with the high-order bit, the preselected number of bits being generated as the inverse of the high-order bit.

21. A method in a data processing system for converting a single-precision floating-point number to a double-precision floating-point number according to claim 19, wherein a special case number is at least one of zero, infinity, a denormalized number, and a NaN.

* * * * *

UNITED STATES PATENT AND TRADEMARK OFFICE
CERTIFICATE OF CORRECTION

PATENT NO. : 5,805,475
DATED : September 8, 1998
INVENTOR(S) : Putrino et al.

It is certified that error appears in the above-identified patent and that said Letters Patent is hereby corrected as shown below:

In the Abstract: Please delete "floating point numbers" from line 1, and insert --floating point numbers-- following the word "converting" on line 2.

Signed and Sealed this

Twenty-sixth Day of January, 1999

Attest:

Attesting Officer

*Acting Commissioner of Patents and Trademarks*